(12) United States Patent
Yamamoto

(10) Patent No.: US 9,919,493 B2
(45) Date of Patent: Mar. 20, 2018

(54) ELECTROMAGNETIC WAVE PENETRATIVE METAL FILM, MANUFACTURING METHOD OF ELECTROMAGNETIC WAVE PENETRATIVE METAL FILM, AND RADOME FOR VEHICLE-MOUNTED RADAR DEVICES

(71) Applicant: Sankei Giken Kogyo Co., Ltd., Tokyo (JP)

(72) Inventor: Shuji Yamamoto, Tokyo (JP)

(73) Assignee: Sankei Giken Kogyo Co., Ltd., Tokyo (JP)

( * ) Notice: Subject to any disclaimer, the term of this patent is extended or adjusted under 35 U.S.C. 154(b) by 269 days.

(21) Appl. No.: 14/355,888

(22) PCT Filed: Nov. 2, 2012

(86) PCT No.: PCT/JP2012/078526
§ 371 (c)(1),
(2) Date: May 2, 2014

(87) PCT Pub. No.: WO2013/065845
PCT Pub. Date: May 10, 2013

(65) Prior Publication Data
US 2014/0313100 A1   Oct. 23, 2014

(30) Foreign Application Priority Data

Nov. 4, 2011   (JP) .................................. 2011-242302

(51) Int. Cl.
*B32B 15/00*  (2006.01)
*B32B 15/04*  (2006.01)
(Continued)

(52) U.S. Cl.
CPC ................ *B32B 15/04* (2013.01); *B32B 3/10* (2013.01); *B32B 15/08* (2013.01); *C23C 18/165* (2013.01);
(Continued)

(58) Field of Classification Search
None
See application file for complete search history.

(56) References Cited

U.S. PATENT DOCUMENTS 3,754,939 A       8/1973   Pearlstein et al.
4,407,871 A  *   10/1983   Eisfeller ................ B05D 5/068
                                                                     427/250

(Continued)

FOREIGN PATENT DOCUMENTS

CN       102637951        *    4/2012
DE    102009029763       *   12/2010
(Continued)

OTHER PUBLICATIONS

Definition of "Corneal" and "Corneous"; Webster's Third New International Dictionary, 2002, Merriam-Webster, p. 507.*

(Continued)

*Primary Examiner* — Seth Dumbris
(74) *Attorney, Agent, or Firm* — The Webb Law Firm

(57) ABSTRACT

An object of the present invention is to provide an electromagnetic wave penetrative metal film having high mass productivity and an extremely low attenuation rate in the electromagnetic wave penetrated through, a manufacturing method of the electromagnetic wave penetrative metal film, and a radome for a vehicle-mounted radar devices using the electromagnetic wave penetrative metal file. To achieve the object, the present invention provides an electromagnetic wave penetrative metal film composed of more than 10000 of fine metal film pieces per unit area (1 mm$^2$) provided on (Continued)

a surface of a substrate through an electroless plating step, wherein fine metal film pieces adjacent to each other are electrically isolated, a manufacturing method of the electromagnetic wave penetrative metal film, and a radome for a vehicle-mounted radar devices using the electromagnetic wave penetrative metal film.

9 Claims, 5 Drawing Sheets

(51) Int. Cl.

| | |
|---|---|
| *C23C 18/20* | (2006.01) |
| *C23C 18/28* | (2006.01) |
| *C23C 18/30* | (2006.01) |
| *C23C 18/44* | (2006.01) |
| *G01S 7/03* | (2006.01) |
| *H01Q 1/42* | (2006.01) |
| *C23C 18/16* | (2006.01) |
| *C23C 18/48* | (2006.01) |
| *C23C 18/31* | (2006.01) |
| *C23C 18/42* | (2006.01) |
| *B32B 15/08* | (2006.01) |
| *B32B 3/10* | (2006.01) |
| *G01S 13/93* | (2006.01) |

(52) U.S. Cl.
CPC ...... *C23C 18/1646* (2013.01); *C23C 18/1689* (2013.01); *C23C 18/2086* (2013.01); *C23C 18/285* (2013.01); *C23C 18/30* (2013.01); *C23C 18/31* (2013.01); *C23C 18/42* (2013.01); *C23C 18/44* (2013.01); *C23C 18/48* (2013.01); *G01S 7/032* (2013.01); *H01Q 1/42* (2013.01); *G01S 13/931* (2013.01); *G01S 2013/9378* (2013.01); *Y10T 428/24917* (2015.01); *Y10T 428/25* (2015.01); *Y10T 428/256* (2015.01)

(56) References Cited

U.S. PATENT DOCUMENTS

| | | | |
|---|---|---|---|
| 5,366,140 A * | 11/1994 | Koskenmaki | ........... H01L 24/29 156/241 |
| 6,184,842 B1 | 2/2001 | Leinweber et al. | |
| 6,328,358 B1 | 12/2001 | Berweiler | |
| 6,673,462 B2 * | 1/2004 | Nakashima | ........... C03C 17/007 204/157.22 |
| 2005/0031897 A1 * | 2/2005 | Kamiya | ............... H01Q 1/3233 428/689 |
| 2011/0236672 A1 * | 9/2011 | Yanagimoto | ............. B05D 5/00 428/323 |

FOREIGN PATENT DOCUMENTS

| | | | | |
|---|---|---|---|---|
| JP | 2000049522 A | | 2/2000 | |
| JP | 2000159039 A | | 6/2000 | |
| JP | 2007119896 A | | 5/2007 | |
| JP | 2010251899 A | | 11/2010 | |
| JP | 2011162839 A | | 8/2011 | |
| JP | 2011163903 A | | 8/2011 | |
| WO | 2011064633 A1 | | 6/2011 | |
| WO | WO2012025822 | * | 2/2012 | ........... C09D 133/04 |

OTHER PUBLICATIONS

"Radio and Microwave Frequency Attenuation in Glass", May 2014, PPG Industries, TD-151, pp. 1-5.*
"Polygon Definition", accessed Mar. 20, 2017, Merriam-Webster, https://www.merriam-webster.com/dictionary/polygonal.*
Cheng et al., Effects of Electroless Plating Chemistry on the Synthesis of Palladium Membranes, Journal of Membrane Science, 2001, pp. 195-203, vol. 182.

* cited by examiner

ELECTROMAGNETIC WAVE PENETRATIVE METAL FILM, MANUFACTURING METHOD OF ELECTROMAGNETIC WAVE PENETRATIVE METAL FILM, AND RADOME FOR VEHICLE-MOUNTED RADAR DEVICES

CROSS-REFERENCE TO RELATED APPLICATIONS

This application is the United States national phase of International Application No. PCT/JP2012/078526 filed Nov. 2, 2012, and claims priority to Japanese Patent Application No. 2011-242302 filed Nov. 4, 2011, the disclosures of which are hereby incorporated in their entirety by reference.

TECHNICAL FIELD

The present invention relates to an electromagnetic wave penetrative metal film having penetration property of electromagnetic wave, a manufacturing method of an electromagnetic wave penetrative metal film, and a radome for a vehicle-mounted radar devices.

BACKGROUND ART

In the conventional technologies, an indium film having a sea-island structure is provided on the surface of a substrate by vacuum deposition method to decorate a member required a penetration property of an electromagnetic wave. The indium film having a sea-island structure not only penetrate electromagnetic waves due to a sea-island structure but also has a sufficient metallic gloss as a decorative metal film because of an extremely fine sea-island structure. Therefore, such an indium film having a sea-island structure is used as a metal film that decorates the cover member (radome) of a vehicle-mounted millimeter wave radar devices, such as an emblem, for example (see "Patent Document 1" and "Patent Document 2").

However, the vacuum deposition method consumes equipment cost for vacuum equipment and the like. Further, as the vacuum deposition method should form a film inside a vacuum chamber, restrictions including the size limitation of the substrate to be a size that can be housed in a vacuum chamber. In addition, as a substrate should be placed in a vacuum chamber for formation of a film once and again, mass productivity is poor.

In addition, a millimeter wave radar devices transmits a transmitting wave in a predetermined angle range, detects a direction where an obstacle presents according to the received wave based on an angle at which the received wave is detected and determines relative speed to the obstacle based on time lag from transmission of the transmitting wave to receiving of the received wave. In the operation, if the transmitting and receiving angles in the transmitted wave and the received wave shift due to attenuation of an electromagnetic wave in the metal film, accurate determination of the position and relative speed of the obstacle may not be achieved.

DOCUMENTS CITED

[Patent Document]
[Patent Document 1] Japanese Patent Laid-Open No. 2000-159039

[Patent Document 2] Japanese Patent Laid-Open No. 2000-049522

SUMMARY OF INVENTION

Problems to be Solved

An object of the present invention is to provide an electromagnetic wave penetrative metal film excellent in mass productivity and extremely low in attenuation rate in an electromagnetic wave penetration, a manufacturing method of the electromagnetic wave penetrative metal film, and a radome for a vehicle-mounted radar devices provided the electromagnetic wave penetrative metal film.

Means to Solve the Problem

As a result of the diligent study of the present inventors, the above object has achieved by adopting the following electromagnetic wave penetrative metal film, manufacturing method of the electromagnetic wave penetrative metal film, and a radome for vehicle-mounted radar devices.

An electromagnetic wave penetrative metal film according to the present invention is composed of more than 10000 fine metal film pieces per square millimeter provided on a surface of a substrate, wherein adjacent fine metal film pieces are electrically isolated.

The electromagnetic wave penetrative metal film according to the present invention is preferable that the fine metal film pieces are adjacent to each other via an insulating channel (clacks), and the insulating channel is distributed in a network throughout the film.

The electromagnetic wave penetrative metal film according to the present invention is preferable that an average maximum width of the fine metal film pieces is 14.1 microns or less.

The electromagnetic wave penetrative metal film according to the present invention is preferable that a film thickness of the metal film is 1 microns or less.

The electromagnetic wave penetrative metal film according to the present invention is preferable that the metal film is composed of palladium or a palladium alloy.

The electromagnetic wave penetrative metal film according to the present invention may be that the metal film has a metallic gloss.

A manufacturing method of an electromagnetic wave penetrative metal film according to the present invention comprises formation of a metal layer on a surface of a substrate through electroless plating method and finishing of a electromagnetic wave penetrative metal film composed of gathered more than 10000 of fine metal film pieces per square millimeter by dividing the metal layer utilizing internal stress remaining in the metal layer.

The manufacturing method of the electromagnetic wave penetrative metal film according to the present invention is preferable that the metal layer is formed on the surface of the substrate to make a thickness of the electromagnetic wave penetrative metal film metal film 1 microns or less.

The manufacturing method of an electromagnetic wave penetrative metal film according to the present invention is preferable that a plated palladium layer or a plated palladium alloy layer is formed on the surface of the substrate by using an electroless palladium plating bath or an electroless palladium alloy plating bath.

A radome for a vehicle-mounted radar devices according to the present invention is characterized in using a cover member is made of the substrate provided with the electromagnetic wave penetrative metal film described above on the surface.

Advantages of the Invention

If the present invention is applied, mass production is made possible and the equipment cost consumed by vacuum equipment and the like required for formation of a metal film having a sea-island structure by vacuum deposition method can be eliminated since the electroless plating method is employed. Further, as the manufacturing method according to the present invention is different from a vacuum vapor deposition method which require film formation in a vacuum chamber, the present invention is free from restrictions on the size of the substrate to be provided the electromagnetic wave penetrative metal film to be a size that can be housed in a vacuum chamber. In addition, employment of an electroless plating method reduce restrictions on the shape of the substrate, i.e. a metal film having electromagnetic wave penetrating properties can also be provided on a substrate having a complicated surface shape. So, a metal film that has a sufficient metallic gloss and penetrate electromagnetic waves can be provided on various products with excellent mass productivity.

Further, the electromagnetic wave penetrative metal film according to the present invention is composed of gathered more than 10000 of fine metal film pieces per square millimeter. Provision of more than 10000 extremely fine metal film pieces (metal films) per square millimeter makes attenuation rate of the electromagnetic wave penetrated through the electromagnetic wave penetrative metal film 0 dB. That is, a millimeter wave radar devices employing the electromagnetic wave penetrative metal film according to the present invention is excellent in the directivity of a transmitting wave and a receiving wave to achieve accurate detection of the position and relative speed of an obstacle.

BRIEF DESCRIPTION OF DRAWINGS

FIG. 4 is a diagram showing the relationship between the average maximum width of fine metal film pieces and the attenuation rate of an electromagnetic wave penetrated through.

PREFERRED EMBODIMENT OF THE INVENTION

Preferred embodiments of an electromagnetic wave penetrative metal film, a manufacturing method of an electromagnetic wave penetrative metal film, and a radome for a vehicle-mounted radar devices according to the present invention will be described below.

<An Electromagnetic Wave Penetrative Metal Film>

Figure 1:
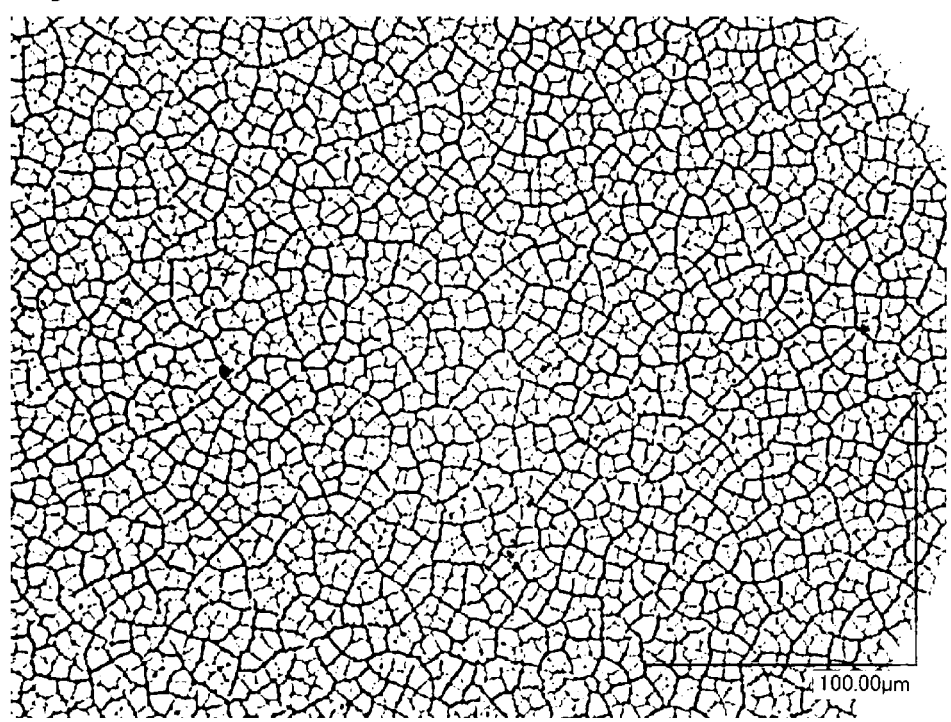
FIG. 1 is a stereo microscopic view at the surface of an electromagnetic wave penetrative metal film prepared in Example 1.

The electromagnetic wave penetrative metal film according to the present invention will be described. The electromagnetic wave penetrative metal film according to the present invention is a metal film composed of more than 10000 of gathered fine metal film pieces per square millimeter provided on a surface of a substrate through an electroless plating step, wherein adjacent fine metal film pieces are electrically isolated. As shown in FIG. 1, the fine metal film pieces adjacent to each other are electrically isolated by insulating channels (cracks), and the insulating channels are distributed in a network throughout the film in a planar view. In this manner, the electromagnetic wave penetrative metal film according to the present invention is composed of a plenty of gathered fine metal film pieces surrounded by insulating channels. In FIG. 1, the insulating channels are narrow regions visually recognized as the black lines, and the fine metal film pieces are white regions having a certain area surrounded by the insulating channels. The electromagnetic wave penetrative metal film and the substrate will be described below in this order. In this embodiment, a millimeter wave penetrative metal film that penetrates a millimeter wave transmitted from and received by a vehicle-mounted millimeter wave radar devices will be mainly described as an example.

1. Electromagnetic Wave Penetrative Metal Film

The electromagnetic wave penetrative metal film according to the present invention is composed of gathered extremely fine metal film pieces and surrounded by fine insulating channels as described above, and the surface of the substrate is covered with these discontinuous fine metal film pieces.

Distribution number of fine metal film pieces: The fine metal film pieces of more than 10000 per square millimeter are distributed on the surface of the substrate as described above. Distribution of more than 10000 fine metal film pieces per square millimeter on the surface of the substrate is preferable since the attenuation rate of the electromagnetic wave penetrated through is made 0 dB. In addition, distribution of more than 10000 fine metal film pieces per square millimeter on the surface of the substrate makes both the fine metal film pieces and the insulating channels extremely fine, and their sizes might be almost uniform also. Therefore, extremely fine metal film pieces and insulating channels can be uniformly distributed on the surface of the substrate to exhibit a sufficient metallic gloss.

On the other hand, the number of fine metal film pieces distributed on the surface of the substrate of 10000 or less per square millimeter is not preferable since a part of an electromagnetic wave may be absorbed and/or reflected by the metal film to make achievement of an attenuation rate of the electromagnetic wave penetrated through of 0 dB difficult. If an electromagnetic wave attenuates in the metal film, a millimeter wave radar devices in which such a metal film is distributed on a radome is not preferable since transmitting and receiving angles shift as described later and a detecting direction of a receiving wave may also shifts. Further, the widths of the insulating channels tend to increase as the number of fine metal film pieces per unit area decreases. The visible width of the insulating channels is not preferable since the electromagnetic wave penetrative metal film is not suitable for decorative use.

Average maximum width of fine metal film pieces: In the present invention, if the maximum width of the fine metal film pieces is in a predetermined size or less referring to the maximum wavelength of electromagnetic waves, absorption and/or reflection by the electromagnetic wave penetrative metal film of an electromagnetic wave having a wavelength equal to or less than the maximum wavelength is prevented and penetration of the electromagnetic wave having the wavelength without attenuation is made possible. Note that the maximum width of the fine metal film piece refers to the longest end to end distance of a fine metal film piece, for example. In addition, a diameter of a circle of which area is equal to the area of the fine metal film piece determined by using an image processor may replace the average maximum width. Specifically, the average maximum width of the fine metal film pieces may be determined through; determination of the number of fine metal film pieces present per square millimeter and the area occupied by the fine metal film pieces by using an image processor, calculation of the average area of the fine metal film pieces, and calculation of the diameter of a circle having an area equal to the average area. If the number of fine metal film pieces distributed on the surface of the substrate is more than 10000 per square millimeter, the average maximum width of the fine metal film pieces is 14.1 microns or less. The value corresponds to the length of a diagonal line if each fine metal film piece are assumed a square having the side length of 10 microns. Although, just the average maximum width has been discussed above, less deviation in the maximum widths of the fine metal film pieces, almost the same size and almost the same shape among the fine metal film pieces are preferable.

Here, discussion will be concentrated into a case where the electromagnetic wave penetrative metal film is used as a metal film for millimeter wave penetration. The average maximum width of the fine metal film pieces of 14.1 microns or less (or the average length at one side of 10 microns or less with assumption that shapes of each fine metal film piece are square) may make the attenuation rate of penetrated millimeter wave or an electromagnetic wave having a smaller frequency than a millimeter wave 0 dB. In contrast, the average maximum width of the fine metal film pieces of exceeding 14.1 microns is not preferable since the distribution number of the fine metal film pieces per square millimeter in the above-described range may not achieved, and a part of an electromagnetic wave is absorbed and/or reflected to attenuate the electromagnetic wave. Such an electromagnetic wave penetrative metal film applied to a millimeter wave radar devices is not preferable since the directivity of the radar may be made poor by the attenuation of the electromagnetic wave as described later with reference to FIG. 2 and FIG. 3. A millimeter wave refers to an electromagnetic wave having a wavelength of 1 mm to 10 mm, a frequency of 30 GHz to 300 GHz. Although, an electromagnetic wave of 76.5 GHz is currently used in a millimeter wave radar devices, it is expected that an electromagnetic wave frequency band around 81 GHz will also be used in the future. Then, a millimeter wave radar devices using an electromagnetic wave of 76.5 GHz will be mainly described in the present invention, but the matter should be noted that the electromagnetic wave in which the electromagnetic wave penetrative metal film can penetrate is not only one having a frequency of 76.5 GHz but the electromagnetic waves having various frequencies.

Figure 2:
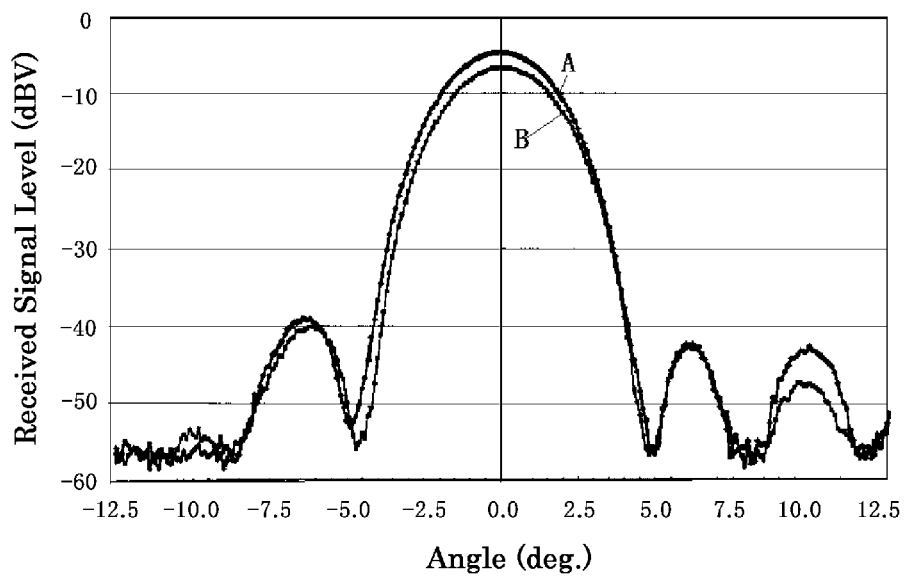
FIG. 2 is a diagram showing the signal levels of receiving waves when a millimeter wave is transmitted and received via a radome.

FIG. 2 shows the signal level distribution of received waves each received when a transmitting wave (millimeter wave) is transmitted in the angle range of ±12.5 degrees from the center position of a millimeter wave radar device. The arrow A indicates a signal level distribution when the millimeter wave is transmitted and received without a radome, and the arrow B indicates a signal level distribution when the millimeter wave is transmitted and received through a radome in the same manner. Note that the radome is a dome-like shaped exterior member having a penetrating property of an electromagnetic wave for protection of an antenna, internal electronic devices, and the like distributed in a millimeter wave radar devices.

Figure 3:
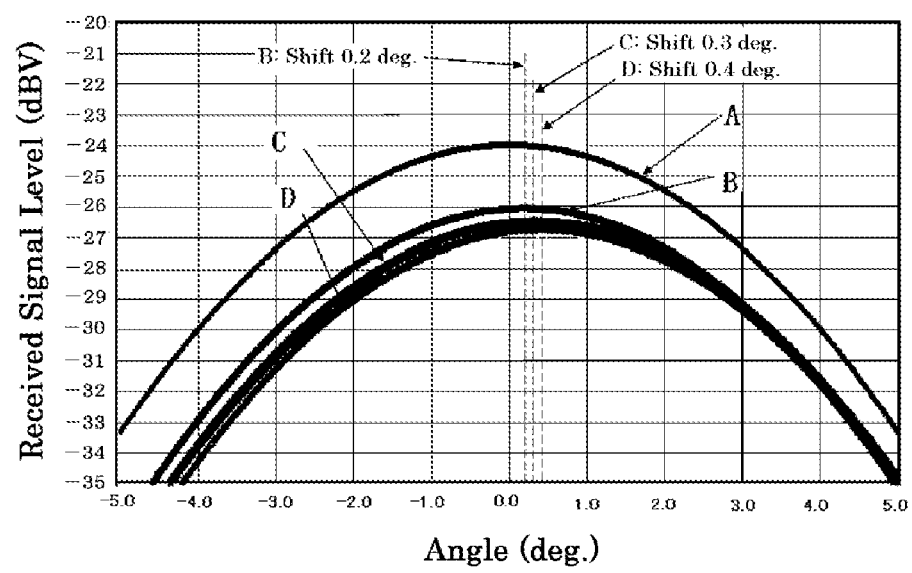
FIG. 3 is a diagram showing the signal levels of received waves when a millimeter wave is transmitted and received via radomes provided with an electromagnetic wave penetrative metal film different in the average maximum widths of fine metal film pieces.

As shown in FIG. 2, when the millimeter wave is transmitted and received without a radome, a signal level distribution as the main lobe is obtained symmetrically around the center of 0 degree. However, when the millimeter wave is transmitted and received through a radome, the signal level of the received wave decreases, and the center position (peak position) of received signal level distribution shifts from 0 degree. FIG. 3 shows the signal level distribution of received waves measured as in FIG. 2 using radomes distributed the electromagnetic wave penetrative metal films having; the average maximum width of the fine metal film pieces of 14.1 microns or less (arrow B), the average maximum width of fine metal film pieces of 20 microns (arrow C), and the average maximum width of fine metal film pieces of 30 microns (arrow D). In FIG. 3, the arrow A indicates the signal level distribution of a received wave when a millimeter wave is transmitted and received without a radome.

As shown in FIG. 3, if the electromagnetic wave penetrative metal film having the average maximum width of fine metal film pieces of 14.1 microns or less is used, a received wave shifts 0.2 degrees from the center position of the signal level distribution. With the electromagnetic wave penetrative metal film having the average maximum width of fine metal film pieces of 20 microns, a shift is 0.3 degrees, and with the electromagnetic wave penetrative metal film having the average maximum width is 30 microns, a shift is 0.4 degrees.

The attenuation rate of the electromagnetic wave penetrated through the electromagnetic wave penetrative metal film is confirmed to be 0 dB if the average maximum width of fine metal film pieces is 14.1 microns or less in the electromagnetic wave penetrative metal film. So, it is considered that the decrease in the signal level of the received wave indicated by the arrow B and the shift of the signal level distribution may be due to the material and/or the shape of the substrate. Therefore, a position of an obstacle can be detected with good accuracy by previously regulated receiving angle based on the shift in the signal level distribution due to the substrate.

On the other hand, if the average maximum width of the fine metal film pieces exceeds 14.1 microns, as the attenuation rate of the penetrated electromagnetic wave may not be 0 dB. As a result, transmitting and receiving of a millimeter wave via the metal film also attenuate the electromagnetic wave and the signal level of the received wave decreases. In addition, the electromagnetic wave penetration of not 0 dB may deviate penetration among positions to make shift of the signal level distribution from the center position increases. In addition, the signal level decrease of the received wave and the shift of the receiving angle may deviate among the direction to where the millimeter wave is transmitted and received since it is difficult to make the attenuation rate of the electromagnetic wave penetrates through the entire surface of the radome uniform. Therefore, if an electromagnetic wave penetrative metal film in which the attenuation rate of an electromagnetic wave is not 0 dB is applied to a radome, accurate detection of a position of an obstacle is made difficult. In addition, as deviations among manufacturing lots of a radome may be different, accuracy in position detection among manufactured devices may deviate also.

As described above, preferable average maximum width of the fine metal film pieces is 14.1 microns or less. Thus, attenuation rate of the millimeter wave penetrated through is made 0 dB, and by applying the electromagnetic wave penetrative metal film to a radome, a position of an obstacle can be detected in a good accuracy.

Insulating channels: In the present invention, the insulating channels refer to gaps separating the fine metal film pieces, and electrically isolate fine metal film pieces adjacent to each other as described above. These insulating channels are composed of cracks generated due to remaining internal stress in a continuous metal layer formed on the surface of a substrate through electroless plating method as described later. The width of the insulating channel is not particularly limited but should be the width that can distribute more than 10000 fine metal film pieces per square millimeter. In addition, the width of the insulating channel is required to be sufficiently achieve the insulation between the fine metal film pieces adjacent to each other. That is, widths should be enough not to cause a short circuit between the fine metal film pieces adjacent to each other to electrically isolate the individual fine metal film pieces. Further, the width of the insulating channel is preferable not to be visually recognized by the naked eye since the electromagnetic wave penetrative metal film according to the present invention is used as the decorative film for an exterior member.

Film thickness of the metal layer: Although the maximum film thickness of the metal film is 1 micron in the present invention, preferable thickness is 0.01 microns to 0.5 microns. If the film thickness of the electromagnetic wave penetrative metal film is less than 0.01 microns, the poor brightness may not achieve sufficient metallic gloss. In contrast, if the film thickness of the electromagnetic wave penetrative metal film exceeds 0.5 microns, distribution of a plenty of fine insulating channels is made hard after formation of the metal layer through electroless plating method as described later, and distribution of more than 10000 of the above-described fine metal film pieces per square millimeter is made difficult. From such viewpoint, the film thickness of the electromagnetic wave penetrative metal film is more preferable to be 0.3 microns or less, furthermore preferable to be 0.1 microns or less.

Metal constituting a metal film: The metal constituting a metal film may be any metal as long as that can deposit through electroless plating method and is a metal that can achieve the above-described structure. However, according to a reason described later, the preferable metal film may be composed of palladium or a palladium alloy in the present invention. The palladium alloys exemplified include palladium-phosphorus, palladium-nickel, palladium-nickel-phosphorus, and palladium-cobalt. If palladium or a palladium alloy is employed, ultrathin film described above may exhibit a sufficient metallic gloss. Further, as electroless plated palladium or a palladium alloy is a metal having relatively high internal stress, generation of a plenty of fine insulating channels in the metal layer formed through electroless plating method due to residual internal stress is easy.

Furthermore, as palladium is a precious metal, oxidization less likely occur in comparison with nickel or tin and less likely to discolor in any environment.

2. Substrate

The substrate according to the present invention will be described. As the substrate on which the electromagnetic wave penetrative metal film is provided, various materials including resins, ceramics, paper, glass, and fibers can be used. As the resins, either of thermoplastic insulating resins and thermosetting insulating resins may be used, and the material of the resin used as the substrate is not particularly limited. Examples of the insulating resins applicable for the substrate include ABS (acrylonitrile-butadiene-styrene) resins, AES (acrylonitrile-ethylene-styrene) resins, acrylic resins, polyacetal resins, polyamide resins, polyamideimide resins, polyimide resins, polyurethane resins, polyester resins, polyethylene resins, polyethylene naphthalate resins, polyethersulfones, polyetheretherketones, liquid crystal polymers (LCP), polyvinyl chloride resins, polyolefin resins, polycarbonate resins, polystyrene resins, polysulfone resins, cellulose resins, and polyphenylene sulfide resins. However, these resins are just exemplified and various thermoplastic insulating resins and thermosetting insulating resins can be used as the substrate in the present invention.

The shapes of the substrate are not particularly limited, and include plate materials, sheet materials, film materials, and in addition, a 3-dimentional shape material such as the emblems of automobiles described above. As the electromagnetic wave penetrative metal film according to the present invention is provided through electroless plating method, the metal layer can be provided on the entire surface of the substrate with good accuracy even on a substrate having a complicated 3-dimentional shape.

Undercoat layer: When a metal layer is formed on the surface of a substrate through electroless plating method, various undercoat layers may be provided to modify surface of the substrate. Particularly, as a metal layer is formed on the surface of a substrate through electroless plating method followed by generation of cracks utilizing internal stress remaining in the metal layer in the present invention as described later, an undercoat layer having elasticity and good in adhesion is preferable to be provided between the substrate and the metal layer. Such an undercoat layer may be formed through steps; dissolving of an acrylic resin or a urethane-based resin in a solvent to prepare a varnish, coating of the varnish on the surface of a substrate, and drying or UV curing.

<Manufacturing Method of an Electromagnetic Wave Penetrative Metal Film>

Next, a manufacturing method of the electromagnetic wave penetrative metal film will be described. A manufacturing method of an electromagnetic wave penetrative metal film according to the present invention is characterized in composed of formation of a metal layer on the surface of a substrate through an electroless plating method and finishing of an electromagnetic wave penetrative metal film composed of gathered more than 10000 of fine metal film pieces per square millimeter by dividing the metal layer utilizing internal stress remaining in the metal layer. As is apparent, the manufacturing method according to the present invention is characterized in having no special treatment for finally dividing a metal layer to provide an electromagnetic wave penetrative metal film composed of fine metal film pieces. In other words, as a method for generation of cracks in a metal layer does not include heat treatment in the present invention, the substrate is free from influence of heat even when a substrate made of a resin is employed, and a fine metal film pieces uniform and without irregularity in the shape can be provided.

Here, there is no particular limitation on the specific procedure of electroless plating in the present invention as long as the metal layer can be formed. For example, a metal layer may be formed on the surface of a substrate by a popular procedure including steps; immersion of a substrate in a tin-palladium mixture catalyst solution generally referred to as a catalyst solution, water-rinsing of the substrate, immersion of the substrate in an accelerator (accelerating agent) composed of 5 vol % to 10 vol % sulfuric acid or hydrochloric acid, followed by immersion into an electroless plating bath and deposition of a metal utilizing palladium catalyst adsorbed on the surface of the substrate. However, the present invention is different from a conventional method in which a metal layer for decoration is formed on the surface of a substrate through popular electroless plating method in the following points.

Discontinuous non-conductive metal layer: The present invention is characterized in forming a metal layer on the surface of a substrate through electroless plating method, followed by generating fine cracks by utilizing internal stress remaining in the metal layer in a post treatment step including a water rinsing step or a drying step, to form insulating channels as referred to the present invention in a network. The drying step may be performed by air drying or may be the step of drying at a temperature with negligible influence of heat on the substrate.

Immersion time in an electroless plating bath: Although, a substrate is sufficiently immersed in an electroless plating bath until a completely continuous conductive layer is formed on the surface of the substrate in the conventional electroless plating, a completely continuous conductive layer on the surface of the substrate is not necessary in the present invention, i.e. the immersion time can be reduced compared to the conventional manner. Even though the immersion time of the substrate in an electroless plating bath may be different depending on the specific bath composition including a concentration of the metal salt, 30 seconds to 90 seconds is preferable. If the immersion time of the substrate in the electroless plating bath is in the range, generation of a plenty of cracks in the plated entire metal layer utilizing internal stress remaining in the metal layer is made possible in a post treatment step to provide a gathered more than 10000 fine metal film pieces per square millimeter.

In contrast, the immersion time of less than 30 seconds is not preferable since sufficient fine cracks may not generate and the distribution number of a gathered fine metal film pieces per square millimeter is made 10000 or less. In addition, the immersion time of more than 90 seconds is not preferable in appearance since even a metal film having cracks may be provided on the surface of the substrate, the cracks may be visually recognized by the naked eye to make the decorative properties poor. In addition, the immersion time exceeding 90 seconds may increase the thickness of the metal layer and it makes formation of a metal film composed of a gathered more than 10000 fine metal film pieces per square millimeter difficult also.

If the manufacturing method of an electromagnetic wave penetrative metal film according to the present invention is employed, even if a continuous metal layer is formed just after the substrate is took out from the electroless plating bath, a discontinuous non-conductive metal film composed of a gathered fine metal film pieces can be provided on the surface of the substrate through a post treatment step, such as a water rinsing step or a drying step.

Electroless plating bath: As for the electroless plating bath, popular electroless plating bath including a metal salt (including an alloy) to be deposited on a substrate surface and a reducing agent can be applicable. As described above, preferable metal layer is composed of a metal having high internal stress, such as palladium or a palladium alloy, and then an electroless palladium plating bath or an electroless palladium alloy plating bath is preferable to be used.

Of course, when a metal layer is formed on the surface of a substrate through electroless plating method, various pretreatments, such as cleaning treatment including degreasing treatment and acid/alkali rinsing, conditioning treatment and predip treatment using a commercially available chemical solution may be applicable.

In addition, if the surface of the substrate is smooth to hardly keep the catalyst, pretreatment, such as roughening treatment on the surface of the substrate by mechanically, chemically and/or optically (UV treatment and plasma treatment) may be performed. In addition, to improve the catalyst adhesion ability of the substrate, an undercoat layer formed using the hydrophilic resin material described above may be provided.

Further, appropriate post treatments, such as cleaning of the surface by water rinsing may be performed after providing of the electromagnetic wave penetrative metal film.

<Application of an Electromagnetic Wave Penetrative Metal Film According to the Present Invention>

The electromagnetic wave penetrative metal film according to the present invention is preferable to be used as a metal film that decorates the cover member (radome) of a millimeter wave radar devices.

Vehicle-mounted radar devices: A vehicle-mounted radar devices according to the present invention (not shown) comprises transmitting means for transmitting a millimeter wave as a transmitting wave, receiving means for receiving a millimeter wave as a received wave in which the transmitting wave is reflected by obstacles such as a preceding vehicle, measuring means for measuring time lag from the transmission of the transmitting wave to the receiving of the received wave, calculation means for calculating the matters including distance from the obstacle and relative speed against the obstacle based on the time lag measured by the measuring means. Such a vehicle-mounted radar device is generally distributed at the back side of an exterior member of a vehicle such as the front grille of a vehicle. More specifically, the vehicle-mounted radar device is distributed behind an emblem provided on a front grille at the center of the vehicle width direction or behind the emblem and the front grille. So, an emblem or/and a front grille may be the cover member of a millimeter wave radar devices.

Emblem: A layer structure of the emblem may be composed of a back-side color-coated layer including a masking portion and an electromagnetic wave penetrative metal film according to the present invention sequentially stacked on the back surface of a transparent substrate made of a polycarbonate resin. The electromagnetic wave penetrative metal film provided on the masked design portion can be observed from the front side of the substrate. So, in the front side view of the emblem through the substrate, the electromagnetic wave penetrative metal film is looked to be provided only on the design portion. In addition, a protective film for protecting the electromagnetic wave penetrative metal film is preferably provided on the metal film. As the electromagnetic wave penetrative metal film according to the present invention is a gathered extremely fine metal film piece, adhesion to the substrate surface is limited in a certain level. However, if the protective film is provided, the electromagnetic wave penetrative metal film can be prevented from flaking off from the surface of the substrate.

In another embodiment of the emblem, a structure in which the electromagnetic wave penetrative metal film according to the present invention is provided on the front surface of a substrate molded in the emblem shape may be employed. Specifically, a layer structure may comprise the electromagnetic wave penetrative metal film according to the present invention, a design coating layer, and a top coat layer sequentially provided on the front surface of a substrate formed in a predetermined emblem shape. In this case, as a layer structure in which the electromagnetic wave penetrative metal film is not provided on the back side of the substrate is employed and the electromagnetic wave penetrative metal film is provided on the front surface of the substrate, an opaque substrate can be used. As the opaque substrate, ABS resins, AES resins, polycarbonate resins, and cycloolefin polymers may be used. Also, the electromagnetic wave penetrative metal film can be prevented from flaking off from the surface of the substrate nevertheless the adhesion between the electromagnetic wave penetrative metal film and the substrate is limited in a certain level since the electromagnetic wave penetrative metal film is sandwiched between the substrate and the design coating layer or the top coat layer.

Front grille: The front grille may also have a structure in which the electromagnetic wave penetrative metal film according to the present invention is provided on the surface of a resin substrate molded in a front grille shape. In the structure, the front grille may be molded in a conventionally known method except that the electromagnetic wave penetrative metal film according to the present invention is provided on the surface of a resin substrate.

According to the embodiments described above, as the electroless plating is employed, the equipment cost consumed by vacuum equipment and the like can be reduced in comparison with a method where a metal film having a sea-island structure is formed by vacuum deposition method. In addition, as the present method does not require a film formation in a vacuum chamber as different from a vacuum deposition method, the method is free from restrictions in the substrate size, for example, the size of the substrate on which the electromagnetic wave penetrative metal film is to be provided should be limited to a size that can be housed in a vacuum chamber. Further, as the electroless plating is employed, restrictions on the shape of the substrate are few, and an electromagnetic wave penetrative metal film composed of fine metal film pieces can be provided on a substrate having a complicated surface shape. Therefore, an electromagnetic wave penetrative metal film which has a sufficient metallic gloss and penetrate electromagnetic waves can be provided on various products at low cost with excellent mass productivity.

Further, the attenuation rate of the electromagnetic wave penetrated through the electromagnetic wave penetrative metal film is made 0 dB in the present invention since more than 10000 fine metal film pieces per square millimeter are distributed on the surface of the substrate. So, as the deviation in the attenuation rate of the electromagnetic wave penetrated the radome region among the radar area is made small, no shift occurs in transmitting and receiving angles when a transmitting wave and a receiving wave are transmitted and received in a millimeter wave radar devices employing the electromagnetic wave penetrative metal film according to the present invention, and the position and relative speed of an obstacle can be detected with good accuracy.

As the embodiments described above are some aspects of the present invention, appropriate arrangements may be performed without deviation from the intention of the present invention. Although the cover member disposed at the millimeter wave path of a millimeter wave radar devices is exemplified as the electromagnetic wave penetrative metal film in the embodiments, application of the electromagnetic wave penetrative metal film according to the present invention is not limited to decoration of the cover member of a millimeter wave radar devices mainly described. As described above, the electromagnetic wave penetrative metal film according to the present invention can selectively penetrate electromagnetic waves having various wavelengths by appropriately adjusting the distribution number of fine metal film pieces per square millimeter and/or the average maximum width of the fine metal film pieces.

Then, the present invention will be specifically described by referring Examples and Comparative Examples. However, the present invention is not limited to the following Examples.

Example 1

In Example 1, a polycarbonate sheet of 20 mm W, 50 mm H and 0.3 mm t was used as a substrate. One surface of the substrate was provided a 20 microns thick undercoat layer by spray-coating a varnish prepared by diluting an acrylic resin with a solvent followed by UV-curing.

Next, the substrate provided with the undercoat layer was subjected to alkaline degreasing at 60 deg.-C. Then, the substrate was immersed in a commercially available conditioning solution at 45 deg.-C for 2 minutes and then immersed in a tin-palladium aqueous solution having concentration of 0.3 g/L at 45 deg.-C for 2 minutes.

Then, the substrate was immersed in a 10% sulfuric acid aqueous solution at 45 deg.-C for 1 minute. Next, the substrate adsorbed a palladium metal as a catalyst on the undercoat layer through the above steps was immersed in the electroless palladium-phosphorus alloy plating bath having the following bath composition at 40 deg.-C for 40 seconds to form a metal layer composed of palladium-phosphorus alloy on the surface of the undercoat layer.

Electroless palladium-phosphorus alloy plating bath
Palladium chloride: 0.01 mol/L
Sodium hypophosphite: 0.2 mol/L
Thiodiglycolic acid: 3.0 g/L Then, just after pulling up the substrate from the electroless palladium-phosphorus alloy plating bath, cracks generated due to residual stress, and an electromagnetic wave penetrative metal film composed of a gathered fine metal film pieces of which distribution number is 30720/mm$^2$ was provided. The average maximum width of the fine metal film pieces was 8.1 microns and the film thickness of the metal film was 0.027 microns. If it is assumed that each fine metal film piece has a square shape, the average length at one side (hereinafter referred to as "one side average length") is 5.7 microns.

Example 2

In Example 2, an electromagnetic wave penetrative metal film was provided in the same manner as in Example 1 except the immersing time of the substrate in the electroless palladium-phosphorus alloy plating bath of 70 seconds. The distribution number of fine metal film pieces was 10203/mm$^2$, the average maximum width of the fine metal film pieces was 13.9 microns (one side average length of 9.9 microns), and the film thickness was 0.055 microns.

COMPARATIVE EXAMPLES

Comparative Example 1

In Comparative Example 1, an electromagnetic wave penetrative metal film was provided in the same manner as in Example 1 except that the substrate was immersed in the electroless palladium-phosphorus alloy plating bath described later with the bath temperature of 50 deg.-C and the immersing time of 30 seconds. Distribution number of the fine metal film pieces distributed on the surface of the substrate was 3614/mm$^2$, and the average maximum width of the fine metal film pieces was 23.5 microns (one side average length of 15.7 microns).

Electroless palladium-phosphorus alloy plating bath
Palladium chloride: 0.01 mol/L
Sodium hypophosphite: 0.2 mol/L
Thiodiglycolic acid: 200 mg/L Comparative Example 2

In Comparative Example 2, an electromagnetic wave penetrative metal film was provided in the same manner as in Comparative Example 1 except the immersing time for the substrate in the electroless palladium-phosphorus alloy plating bath of 70 seconds. Distribution number of the fine metal film pieces distributed on the surface of the substrate was 496/mm$^2$, and the average maximum width of the fine metal film pieces was 63.5 microns (one side average length of 45.0 microns).

Comparative Example 3

In Comparative Example 3, an electromagnetic wave penetrative metal film was provided by employing an electroless palladium-phosphorus alloy plating bath similar to that in Comparative Example 1 except that thiodiglycolic acid was not contained, and setting other conditions similar to those in Comparative Example 1. Distribution number of the fine metal film pieces distributed on the surface of the substrate was 2267/mm$^2$, and the average maximum width of the fine metal film pieces was 29.7 microns (one side average length of 14.9 microns).

Comparative Example 4

In Comparative Example 4, an electromagnetic wave penetrative metal film was provided in the same manner as in Comparative Example 3 except the immersing time for the substrate in the electroless palladium-phosphorus alloy plating bath of 70 seconds. Distribution number of the fine metal film pieces distributed on the surface of the substrate was 887/mm$^2$, and the average maximum width of the fine metal film pieces was 47.5 microns (one side average length of 33.7 microns).

<Evaluation>

Attenuation rate of an electromagnetic wave penetrated through the electromagnetic wave penetrative metal films prepared in Examples and Comparative Examples were measured at 76.6 GHz using a network analyzer manufactured by Agilent Technologies. In the measurement, attenuation rate of the electromagnetic wave penetrated through the substrate made of just a polycarbonate was measured first, and then, attenuation rate of the electromagnetic wave penetrated through all of the specimens (substrates provided with electromagnetic wave penetrative metal films) prepared in Examples and Comparative Examples were measured. Then, the attenuation rate of the electromagnetic wave penetrated through the just substrate was subtracted from attenuation rate of the electromagnetic wave penetrated through the specimens to determine attenuation rate of electromagnetic wave penetrated through the electromagnetic wave penetrative metal films prepared in Examples and Comparative Examples. Results are shown in Table 1. In addition, a graph showing attenuation rate of the electromagnetic wave penetrated through against the average maximum width of the fine metal film pieces is shown in FIG. 4.

TABLE 1

|  | Average maximum width (microns) | Attenuation rate (dB) |
| --- | --- | --- |
| Example 1 | 8.1 | 0.00 |
| Example 2 | 13.9 | 0.00 |
| Comparative Example 1 | 23.5 | −0.38 |
| Comparative Example 2 | 63.5 | −1.30 |
| Comparative Example 3 | 29.7 | −0.45 |
| Comparative Example 4 | 47.5 | −0.87 |

Figure 4:
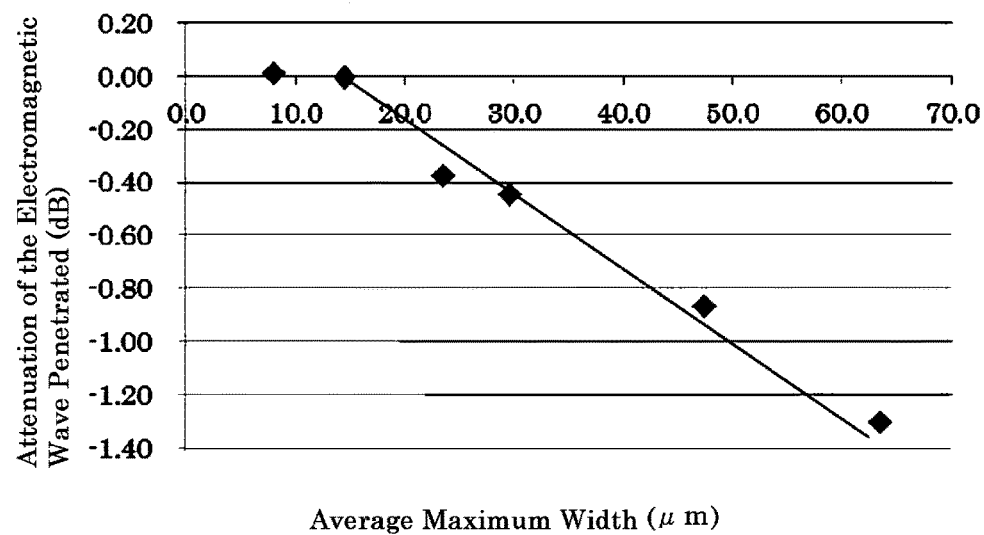
Figure 5:
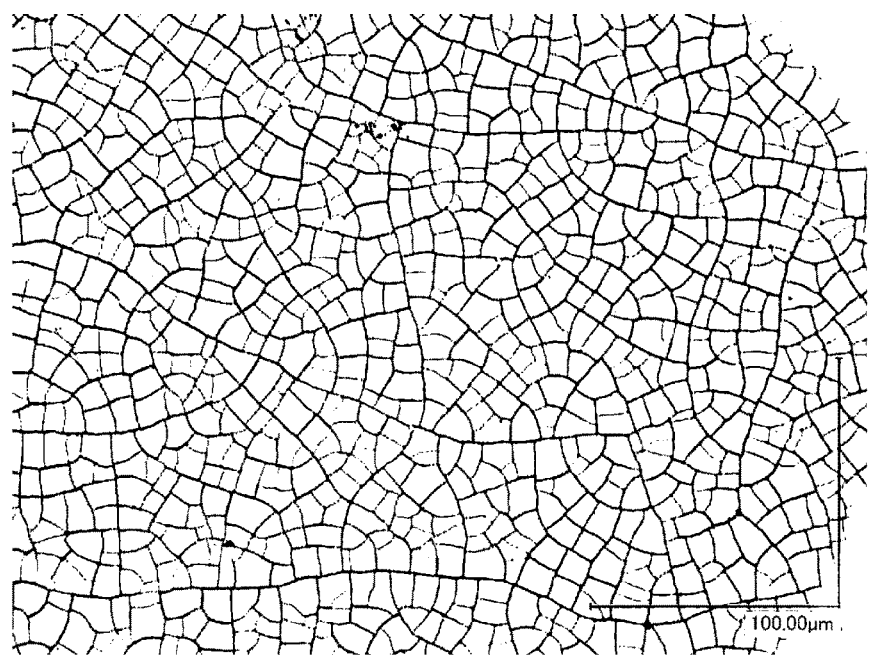
FIG. 5 is a stereo microscopic view at the surface of an electromagnetic wave penetrative metal film prepared in Example 2.
Figure 6:
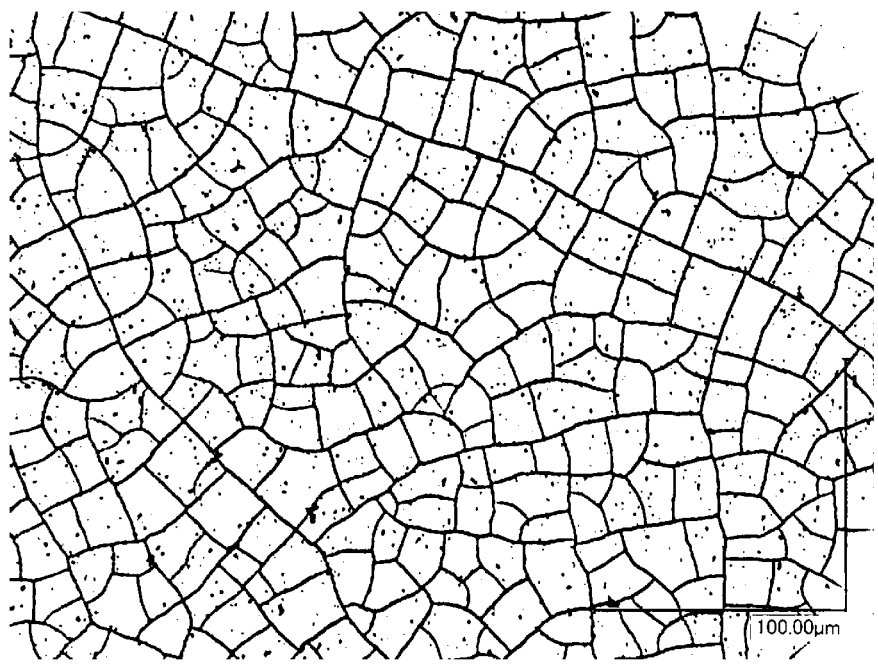
FIG. 6 is a stereo microscopic view at the surface of an electromagnetic wave penetrative metal film prepared in Comparative Example 1.
Figure 7:
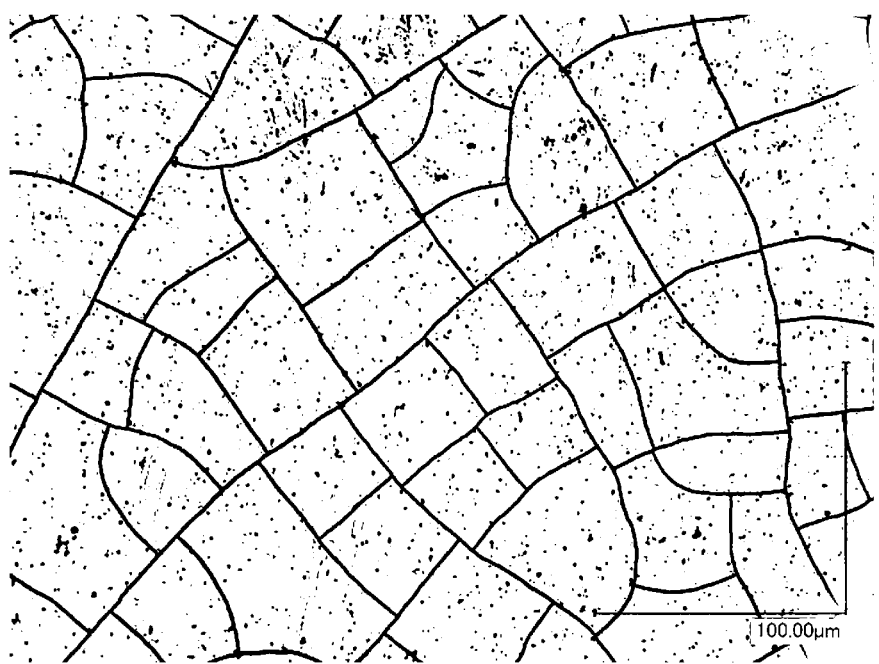
FIG. 7 is a stereo microscopic view at the surface of an electromagnetic wave penetrative metal film prepared in Comparative Example 2.
Figure 8:
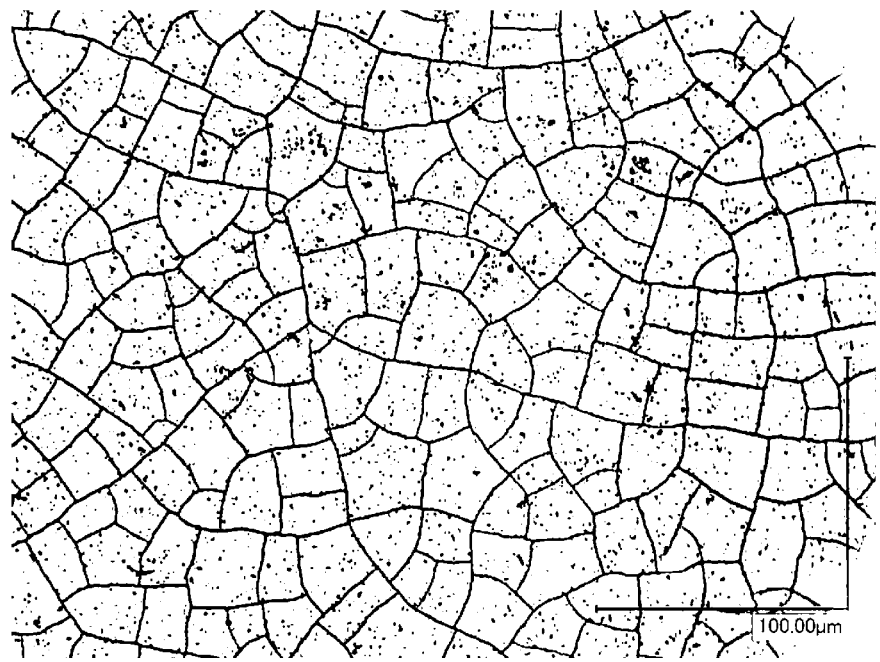
FIG. 8 is a stereo microscopic view at the surface of an electromagnetic wave penetrative metal film prepared in Comparative Example 3.
Figure 9:
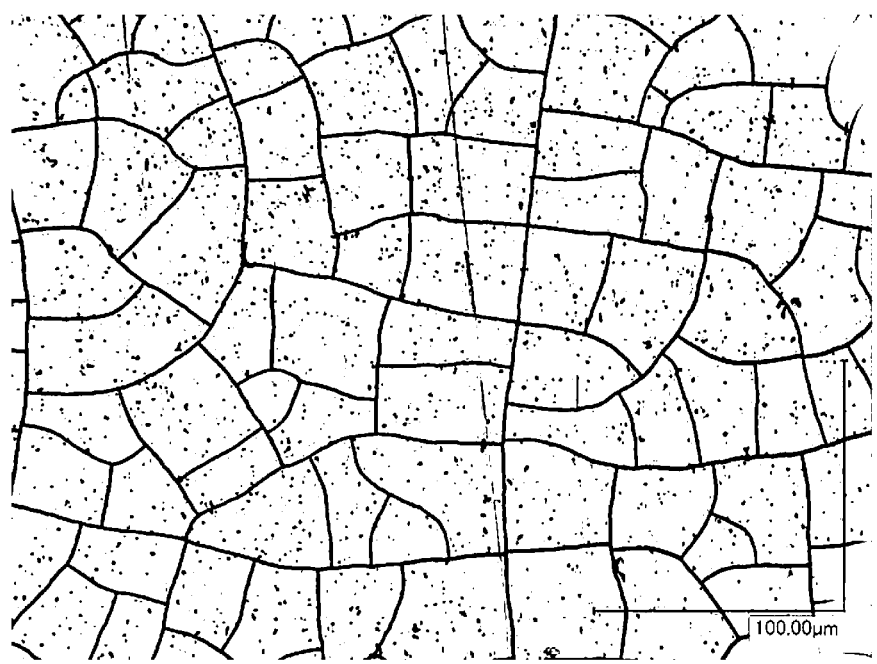
FIG. 9 is a stereo microscopic view at the surface of an electromagnetic wave penetrative metal film prepared in Comparative Example 4.

As shown in Table 1 and FIG. 4, the matter is confirmed that the attenuation rate of the electromagnetic wave penetrated through is in inverse ratio to both the distribution number and average maximum width of the fine metal film pieces constituting the electromagnetic wave penetrative metal film. Further, attenuation rate of the electromagnetic wave penetrated through is 0 dB if the distribution number of the fine metal film pieces is more than 10000/mm$^2$ and average maximum width of the fine metal film pieces is 14.1 microns or less.

In addition, in comparison among the electromagnetic wave penetrative metal films in Example 1 to Example 2 and the electromagnetic wave penetrative metal films in Comparative Example 1 to Comparative Example 4, the matter is confirmed that the areas of each fine metal film piece are narrow and the average maximum widths are small in the electromagnetic wave penetrative metal films prepared in Example 1 and Example 2 as shown in FIG. 1 and FIG. 5 to FIG. 9. In addition, the matter that size deviation among the fine metal film pieces of the electromagnetic wave penetrative metal films in Example 1 and Example 2 are small is made apparent from big distribution number of the fine metal film pieces. In contrast, small distribution number of the fine metal film pieces makes the sizes among fine metal film pieces deviates as in the electromagnetic wave penetrative metal films prepared in Comparative Examples. That is, the attenuation rate of the millimeter wave penetrated through may increase, and attenuation rate of penetrated millimeter wave in the plane direction may deviates also in the electromagnetic wave penetrative metal films prepared in Comparative Examples. As a result, the transmitting and receiving angles of a millimeter wave shift as in the discussion on FIG. 2 and FIG. 3 to make accurate detection of a position where an obstacle is present difficult. In contrast, if the electromagnetic wave penetrative metal films prepared in the Examples are used, both a transmitting wave and a receiving wave transmitted and received by a millimeter wave radar devices may be transmitted and received in previously designed directions and it makes accurate detection of the position and relative speed of an obstacle possible.

INDUSTRIAL APPLICABILITY

As the electromagnetic wave penetrative metal film according to the present invention employs electroless plating method in manufacturing, an electromagnetic wave penetrative metal film which has a sufficient metallic gloss and penetrates electromagnetic waves can be provided on the surface of substrates having various shapes. Therefore, an electromagnetic wave penetrative metal film having a sufficient metallic gloss can be provided on various products with good mass productivity.

The invention claimed is:

1. An electromagnetic wave penetrative metal film comprising 10.203 or more fine metal film pieces per square millimeter provided on a surface of a substrate, wherein adjacent fine metal film pieces are electrically isolated, wherein an average maximum width of the fine metal film pieces is 13.9 microns or less, and wherein an attenuation rate of the electromagnetic wave penetrative metal film in an electromagnetic wave penetration is 0 dB.

2. The electromagnetic wave penetrative metal film according to claim 1, wherein the fine metal film pieces are adjacent to each other via an insulating channel, and the insulating channel is distributed in a network of cracks throughout the film.

3. The electromagnetic wave penetrative metal film according to claim 1, wherein a film thickness of the metal film is 1 microns or less.

4. The electromagnetic wave penetrative metal film according to claim 1, wherein the metal film is composed of palladium or a palladium alloy.

5. The electromagnetic wave penetrative metal film according to claim 1, wherein the metal film has a metallic gloss.

6. A manufacturing method of an electromagnetic wave penetrative metal film according to claim 1 comprising formation of a metal layer on a surface of a substrate through an electroless plating method and finishing of the electromagnetic wave penetrative film as a gathered 10,203 or more fine metal film pieces per square millimeter by dividing the metal layer utilizing internal stress remaining in the metal layer.

7. The manufacturing method of an electromagnetic wave penetrative metal film according to claim 6, wherein the metal layer is formed on the surface of the substrate to make a thickness of the electromagnetic wave penetrative metal film 1 microns or less.

8. The manufacturing method of an electromagnetic wave penetrative film according to claim 6, wherein the metal layer comprises a plated paladium layer or a plated paladium alloy layer formed on the surface of the substrate using an electroless palladium plating bath or an electroless palladium alloy plating bath.

9. A radome for a vehicle-mounted radar devices using a cover member, wherein the cover member is made of the substrate provided with the electromagnetic wave penetrative metal film according to claim 1 on the surface.

* * * * *

UNITED STATES PATENT AND TRADEMARK OFFICE
CERTIFICATE OF CORRECTION

PATENT NO. : 9,919,493 B2
APPLICATION NO. : 14/355888
DATED : March 20, 2018
INVENTOR(S) : Shuji Yamamoto Page 1 of 1

It is certified that error appears in the above-identified patent and that said Letters Patent is hereby corrected as shown below:

On the Title Page

Column 2, Item (57) ABSTRACT, Line 7, delete "file." and insert -- film. --

In the Claims

Column 15, Line 18, Claim 1, delete "10.203" and insert -- 10,203 --

Column 16, Line 11, Claim 6, after "penetrative" insert -- metal --

Column 16, Line 22, Claim 8, after "penetrative" insert -- metal --

Column 16, Line 23, Claim 8, delete "paladium" and insert -- palladium --

Column 16, Line 23, Claim 8, delete "paladium" and insert -- palladium --

Signed and Sealed this
Fifth Day of June, 2018

Andrei Iancu
*Director of the United States Patent and Trademark Office*